(12) United States Patent
Sharma et al.

(10) Patent No.: US 11,082,398 B2
(45) Date of Patent: Aug. 3, 2021

(54) METHOD FOR SECURING A DHCP SERVER FROM UNAUTHORIZED CLIENT ATTACKS IN A SOFTWARE DEFINED NETWORK

(71) Applicant: NICIRA, INC., Palo Alto, CA (US)

(72) Inventors: Ankur Kumar Sharma, Mountain View, CA (US); Srikanth V. Garimella, San Jose, CA (US)

(73) Assignee: NICIRA, INC., Palo Alto, CA (US)

( * ) Notice: Subject to any disclaimer, the term of this patent is extended or adjusted under 35 U.S.C. 154(b) by 786 days.

(21) Appl. No.: 15/814,981

(22) Filed: Nov. 16, 2017

(65) Prior Publication Data

US 2019/0149515 A1    May 16, 2019

(51) Int. Cl.
*H04L 29/06*    (2006.01)
*H04L 29/12*    (2006.01)
*G06F 9/455*    (2018.01)

(52) U.S. Cl.
CPC ...... *H04L 63/0236* (2013.01); *G06F 9/45558* (2013.01); *H04L 61/2015* (2013.01); *H04L 63/10* (2013.01); *H04L 63/1441* (2013.01); *G06F 2009/45595* (2013.01); *H04L 63/1408* (2013.01); *H04L 63/20* (2013.01)

(58) Field of Classification Search
CPC . H04L 63/0236; H04L 61/2015; H04L 63/10; H04L 63/1408; H04L 63/20; H04L 63/1441; G06F 9/45558; G06F 2009/45595
USPC ........................................................ 726/11
See application file for complete search history.

(56) References Cited

U.S. PATENT DOCUMENTS

| | | | |
|---|---|---|---|
| 8,516,573 B1 * | 8/2013 | Brown ............... | H04L 63/1416 726/22 |
| 8,868,745 B1 * | 10/2014 | Muley .................... | H04L 45/02 709/226 |
| 9,130,982 B2 * | 9/2015 | Gottlieb ............. | H04L 63/1416 |
| 9,178,833 B2 | 11/2015 | Koponen et al. | |
| 9,363,210 B2 | 6/2016 | Lambeth et al. | |
| 9,621,461 B2 * | 4/2017 | Sun ........................ | G06F 9/455 |

(Continued)

OTHER PUBLICATIONS

R. Droms, entitled "Dynamic Host Configuration Protocol" Mar. 1997 (pp. 1-45).

*Primary Examiner* — Kevin Bechtel
*Assistant Examiner* — Thanh H Le

(57) ABSTRACT

An approach for securing a DHCP server against unauthorized client attacks in a SDN environment is presented. In an embodiment, a method comprises: determining a count of sub-interfaces implemented on an interface card of a virtual machine; setting a count of unique client identifiers for the virtual machine to zero; determining whether a dynamic host configuration protocol (DHCP) request has been received from the virtual machine; in response to determining that a DHCP request has been received from the virtual machine, incrementing the count of unique client identifiers; determining whether the count of unique client identifiers exceeds the count of sub-interfaces implemented on the interface card of the virtual machine; and in response to determining that the count of unique client identifiers does not exceed the count of sub-interfaces implemented on the interface card of the virtual machine, forwarding the DHCP request to an uplink port.

20 Claims, 5 Drawing Sheets

(56) References Cited

U.S. PATENT DOCUMENTS

| | | | | |
|---|---|---|---|---|
| 2011/0271345 A1* | 11/2011 | Wolman | .............. | H04L 63/1408 |
| | | | | 726/23 |
| 2014/0201732 A1* | 7/2014 | Haag | ....................... | G06F 21/10 |
| | | | | 718/1 |
| 2018/0048666 A1* | 2/2018 | Alderson | ................ | H04L 45/20 |
| 2020/0213849 A1* | 7/2020 | Zhao | .................... | H04W 12/50 |

* cited by examiner

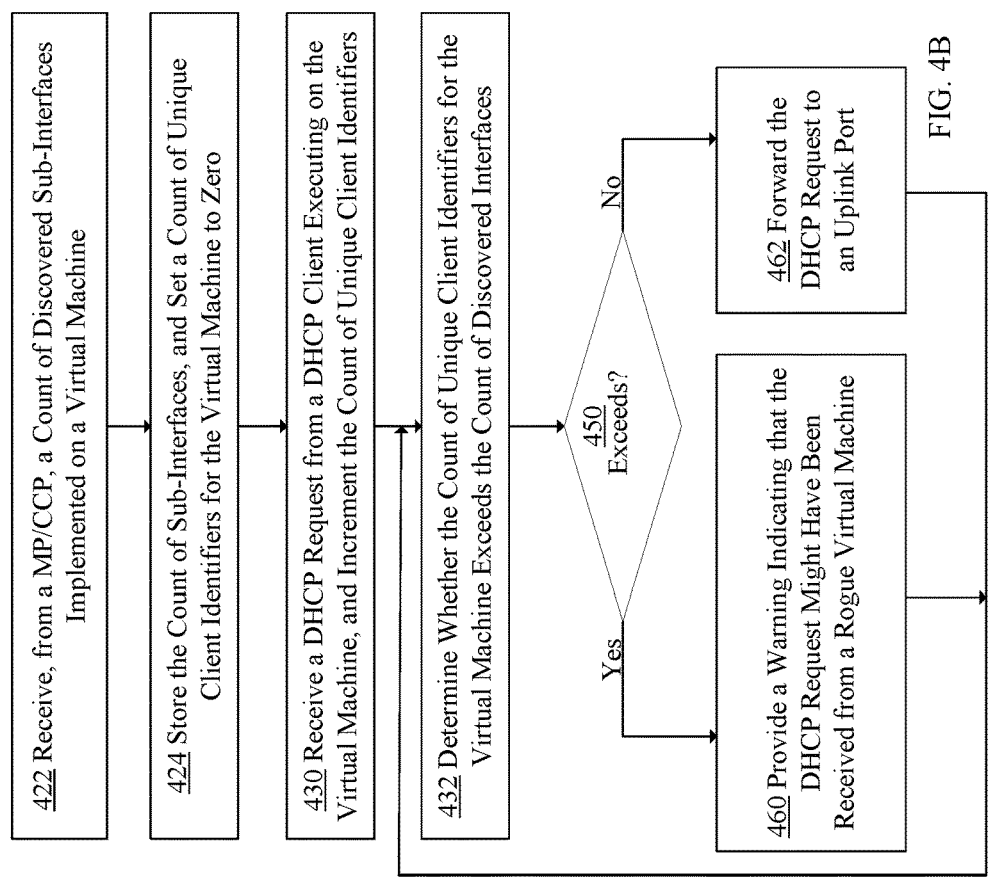
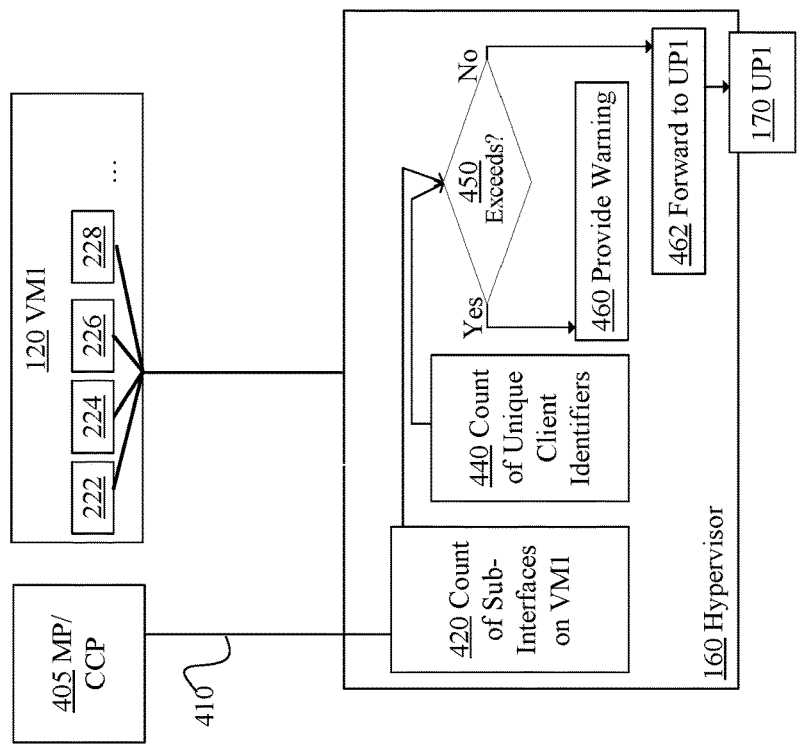
FIG. 4B
FIG. 4A

METHOD FOR SECURING A DHCP SERVER FROM UNAUTHORIZED CLIENT ATTACKS IN A SOFTWARE DEFINED NETWORK

BACKGROUND

The Dynamic Host Configuration Protocol (DHCP) is a standardized network protocol used by DHCP servers to manage and distribute network IP addresses to DHCP clients. The DHCP servers may use the DHCP-compliant communications to automatically respond to request for the IP addresses, and the requestors may automatically generate their requests for the IP addresses. Without the DHCP, assigning the DHCP addresses to the requestors might have been cumbersome and time consuming.

To request a network address, a DHCP client may transmit a DHCP request to a DHCP server. The DHCP request usually includes an identifier of the DHCP client. However, because the DHCP server cannot distinguish between legitimate and illegitimate client identifiers, the DHCP server cannot distinguish between the requests received from legitimate and rogue clients.

Since a DHCP server cannot distinguish between legitimate and illegitimate DHCP requests, the DHCP server cannot stop rogue clients from requesting IP addresses from the DHCP server, and subsequently from having the server's pool of the IP addresses exhausted by the rogue clients. Furthermore, the DHCP server cannot stop rogue clients from releasing, back to the pool, the IP addresses that have been obtained by legitimate clients, and thus from destroying the Internet connections between the legitimate clients.

SUMMARY

Techniques are described herein for configuring a hypervisor to secure a DHCP server against unauthorized client attacks in a software defined networking (SDN) environment. To accomplish this, the hypervisor determines a count of sub-interfaces that have been implemented on a virtual interface card of a virtual machine (VM), and monitors the identifiers included in the DHCP requests received from the VM.

In an embodiment, upon receiving a DHCP request from a DHCP client executing on the VM, the hypervisor tests whether a current count of client identifiers included in the DHCP requests received from the VM has exceeded the count of sub-interfaces implemented on the VM. If the count has been exceeded, then the hypervisor suspects that the DHCP request was received from a rogue DHCP client executing on the VM. Since most likely, the hypervisor will not forward such a request to the DHCP server, the hypervisor will secure the DHCP server from the rogue DHCP client. However, if the count has not been exceeded, then the hypervisor may transmit the DHCP request to the DHCP server. This mechanism is referred to as a soft count restriction if the count of sub-interfaces is provided by the VM itself, or as a hard count restriction if the count of sub-interfaces is provided by a management plane (MP) or a control plane (CP). Both types of count restrictions allow the hypervisor to restrict the DHCP requests, and thus secure the DHCP server, based on the counts of sub-interfaces that have been implemented on the VM.

In an embodiment, prior to transmitting the DHCP request to the DHCP server, the hypervisor may further process the DHCP request. The additional processing of the DHCP request may include extracting a particular client identifier from the received DHCP request, and determining whether the particular client identifier is included in an identifier mapping maintained by the hypervisor. The identifier mapping represents a mapping between the client identifiers received in the DHCP requests from the VM and unique client identifiers provided by the MP. If the particular client identifier is mapped in the identifier mapping onto a particular unique client identifier, then the particular client identifier in the DHCP request is replaced with the particular unique client identifier from the identifier mapping, and the resulting DHCP request is transmitted toward the DHCP server. This mechanism is referred to as a value restriction.

However, if the particular client identifier has no entry in the identifier mapping, then the hypervisor determines whether there is a unique client identifier that has been provided by the MP, but that is not included in the identifier mapping maintained by the hypervisor. If such a unique client identifier is found, then the hypervisor creates a new mapping entry that includes the particular client identifier and the unique client identifier, and adds the entry to the identifier mapping. Furthermore, the hypervisor replaces the particular client identifier in the DHCP request with the unique client identifier, and transmits the resulting DHCP request to the DHCP server. Since the DHCP client is unaware of the replacement and the unique client identifier, the DHCP client cannot use the unique client identifier for malicious purposes. This mechanism is also referred to as a value restriction. However, in this approach, the hypervisor restricts the DHCP requests based on values of the client identifiers included in the requests, and secures the DHCP server from requests that do not contain the unique client identifiers.

BRIEF DESCRIPTION OF THE DRAWINGS

In the drawings:

FIG. 4A depicts an example approach for securing a DHCP server from unauthorized client attacks using a hard count restriction on client identifiers;

FIG. 4B depicts an example flow chart for securing a DHCP server from unauthorized client attacks using a hard count restriction on client identifiers;

DETAILED DESCRIPTION

In the following description, for the purposes of explanation, numerous specific details are set forth in order to provide a thorough understanding of the presently described method. It will be apparent, however, that the present approach may be practiced without these specific details. In other instances, well-known structures and devices are shown in a block diagram form to avoid unnecessarily obscuring the present approach.

Figure 1:
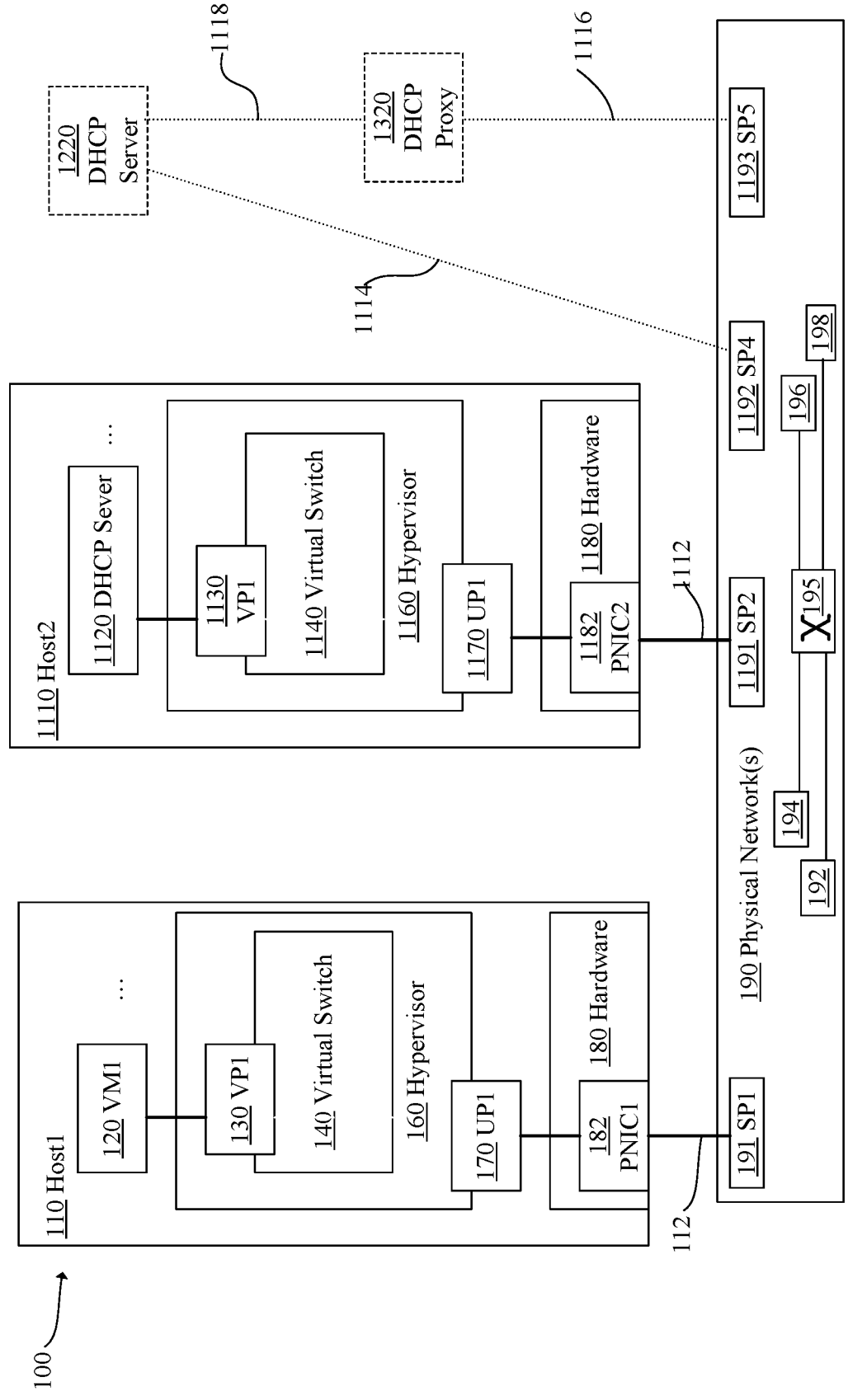
FIG. 1 is a block diagram depicting an example system architecture for securing a DHCP sever from unauthorized client attacks in a SDN environment.

Example System Architecture for Securing a DHCP Sever from Unauthorized Client Attacks FIG. 1 is a block diagram depicting an example system architecture for securing a DHCP sever from unauthorized client attacks in a SDN environment 100. In the depicted example, SDN environment 100 includes one or more hosts 110, 1110, one or more physical networks 190, and one or more DHCP servers. A DHCP server may be implemented as a VM-based-DHCP server 1120, a standalone DHCP server 1220, or a DHCP proxy 1320 that communicates with VM-based-DHCP server 1120, and/or standalone DHCP server 1220.

Host 110 may include a hypervisor 160, and hardware components 180. Hypervisor 160 may include a virtual switch 140, and may provide connectivity to and from one or more virtual machines VM 120. Host 1110 may include a hypervisor 1160, and hardware components 1180. Hypervisor 1160 may include a virtual switch 1140, and may provide connectivity to and from one or more virtual machines VM 1120. Hypervisors 160, 1160 use uplinks 170, 1170, respectively, to provide connectivity to and from physical network interface cards (PNICs) 182, 1182.

Hypervisor 160/1160 may include components that implement an approach for securing a DHCP server from unauthorized client attacks in SDN environment 100. For example, hypervisor 160/1160 may include one or more agents or processors that are configured to monitor DHCP request received from virtual machines and directed to any of the DHCP servers, and process the requests to determine whether the requests were sent from legitimate or rogue DHCP clients. Hypervisor 160/1160 may be implemented as a software layer or a component that supports execution of multiple virtualized computing instances of VMs.

Virtual switch 140/1140 may be implemented as a kernel component of hypervisor 160/1160, or as an entity that is separate from hypervisor 160/1160 but that communicates with hypervisor 160/1160. Virtual switch 140/1140 may be configured to monitor and manage data traffic that is communicated to and from hypervisor 160/1160.

Implementations of virtual switch 140/1140 may vary and may depend on a type of product in which the switch is deployed as a virtualization medium. For example, virtual switch 140/1140 may be implemented as part of hypervisor 160/1160, as it is depicted in FIG. 1, and it as in the vSphere® and KVM® lines of products. Alternatively, although not depicted in FIG. 1, a virtual switch may be implemented as a hardware component, or as part of a user space, or within a privileged virtual machine. Examples of such implementations include the Hyper-V® and Xen® lines of products.

Virtual machines, including VMs 120/1120, may be realized as complete computational environments, containing virtual equivalents of hardware and software components of the physical computing systems. Virtual machines may be instantiated as virtualized computing instances. The instances may be equipped with their own resources, may be assigned their own workloads, and may be configured to perform their own tasks associated with the workloads. Virtual resources allocated to the virtual machines may include virtual CPUs, virtual memory, virtual disks, virtual network interface controllers and the like. The virtual machines may be configured to execute guest operating systems and guest applications.

A virtualized computing instance may be realized as a hardware virtualization and/or a software virtualization. As a hardware virtualization, it may represent for example, an addressable virtual machine. As a software virtualization, it may be used to provide for example, an isolated user space instance. Virtualized computing instances may include containers running on a top of the host operating system, virtual private servers, client computers, and hybrid combinations of thereof.

Hardware components 180/1180 may include hardware processors, memory units, data storage units, and physical network interfaces, not all of which are depicted in FIG. 1. For example, hardware components 180/1180 may also include physical network interface controllers (PNIC1 182, PNIC2 1182) that may provide connectivity to routers and switches of one or more physical networks.

Physical networks 190 may include local area networks and/or wide area networks, and may utilize various types of hardware and software configurations. For example, physical networks 190 may include one or more routers 192, 194, 196, 198, one or more switches 195, and one or more switch ports 191, 1191, 1192, and 1193.

Shortcomings of the Dynamic Host Configuration Protocol

The DHCP usually lacks strong authentication mechanisms for authenticating communications exchanged between DHCP clients and DHCP servers. Therefore, virtually any DHCP client could launch a denial-of-service (DoS) attack on a DHCP server. While the DHCP provides an option for including a client identifier in a DHCP request, the client identifier is nothing more than just an opaque key, and is rather insufficient for authenticating a DHCP client to the DHCP server. Furthermore, since the DHCP places no restrictions on a format for representing the client identifiers, the client identifiers included in the DHCP requests merely allow to differentiate the requests from each other, but not to authenticate the DHCP clients to the DHCP sever.

Because of certain shortcomings of the DHCP, a DHCP client may succeed in launching a DoS attack on a DHCP server by sending for example, a large amount of DHCP requests having different client identifiers. Upon receiving the DHCP requests, the DHCP server may be unable to determine whether the DHCP requests are legitimate or are sent by a rogue client. In fact, upon receiving the DHCP requests, the DHCP server may have no reason to suspect that the requests were sent by a rogue client. Therefore, in response to receiving the requests, the DHCP server may generate and distribute IP addresses to the requestor. However, if the DHCP requests are part of a malicious attack on the DHCP server, then the attack may hinder data traffic in the communications network, exhaust a pool of the IP addresses managed by the DHCP server, and even suspend all communications in the entire network.

Indeed, a rogue DHCP client that launched a DoS attack on a DHCP server may receive a great deal of IP addresses from the DHCP server, and thus exhaust a pool of the IP addresses maintained by the server. The rogue client may potentially masquerade legitimate VMs, and send DHCP requests with client identifiers that the DHCP server cannot discern from the client identifiers received from the legitimate VMs.

Furthermore, a rogue DHCP client may send DHCP release requests, and thus request releasing the IP addresses assigned to legitimate DHCP clients. That may disrupt the operations of the legitimate DHCP clients and the corresponding VMs.

The above described issues may be applicable to any type of DHCP servers. Regardless of whether a DHCP server is implemented in an edge node, such as an edge service gateway, or a VM, or a standalone DHCP server, or a DHCP proxy, each DHCP server may be vulnerable to the attacks described above.

In an embodiment, a mechanism is provided to detect and prevent DoS attacks on DHCP servers. The approach may be implemented in a hypervisor and uses the functionalities of the DHCP. The hypervisor determines a count of sub-interfaces implemented on a VM, and receives and analyzes DHCP requests received from the VM. Based on the information about the sub-interfaces implemented for the VM and unique client identifiers provided by a MP/CCP, the hypervisor determines whether the DHCP requests are received from a rogue DHCP client or nor.

Securing a DHCP Server from Unauthorized Client Attacks

In an embodiment, the approach for securing a DHCP server utilizes the principle that a VM is allowed to use as many different client identifiers as indicated by a count of sub-interfaces that are implemented in a VNIC of the VM. A hypervisor may use the information about the count of sub-interfaces implemented on the VNIC to secure the DHCP sever from unauthorized attacks by monitoring the received DHCP requests and the count. For example, if a particular VNIC of VM1 120 implements three sub-interfaces eth1, eth1:0 and eth1:1, then the hypervisor may determine that the count of sub-interfaces on the particular VNIC is three, and use the count to determine whether a received DHCP request can be served or not.

In an embodiment, a count of sub-interfaces for a VM may be provided by the VM itself. For example, a hypervisor may probe the VM for the count, and the VM may respond to the hypervisor with the count. Alternatively, the count may be provided by an MP or a CCP. The hypervisor may maintain the corresponding counts for the virtual machines that the hypervisor supports, and may use the corresponding counts to determine whether the DHCP requests received by the hypervisor might have been transmitted by a rogue DHCP client. Depending on whether the count is provided by the VM or by the MP/CCP, this approach is referred to as a soft count restriction or a hard count restriction.

In addition to implementing a soft/hard count restriction, a hypervisor may also implement a value restriction. This includes ensuring that a DHCP server does not receive DHCP requests that include so called, overlapping client identifiers. This may be implemented as follows: upon determining a count of sub-interfaces for a VM, the hypervisor may report the count to an MP or a CCP. In response to receiving the count of sub-interfaces, the MP/CCP may generate a set of unique client identifiers and transmit the set to the hypervisor. Then, upon receiving a DHCP request from the VM, the hypervisor may not only use the soft/hard count restriction, but also use the set of unique client identifiers to further process the DHCP requests. For example, the hypervisor may replace a particular client identifier included in the DHCP request with a particular unique client identifier from the set of unique client identifiers provided by the MP/CCP. The modified DHCP request may be transmitted to the DHCP server. However, the DHCP client that originated the DHCP request remains unaware of the substitution. Thus, the DHCP client that originated the DHCP request cannot use, intercept, or release the client identifier or another, legitimate DHCP. Hence, if the DHCP client that originated the DHCP request is actually rogue and launched a DoS attach on the DHCP server, then the attack will be unsuccessful and the DHCP server will be protected from the attack.

Example DHCP Requests

Figure 2:
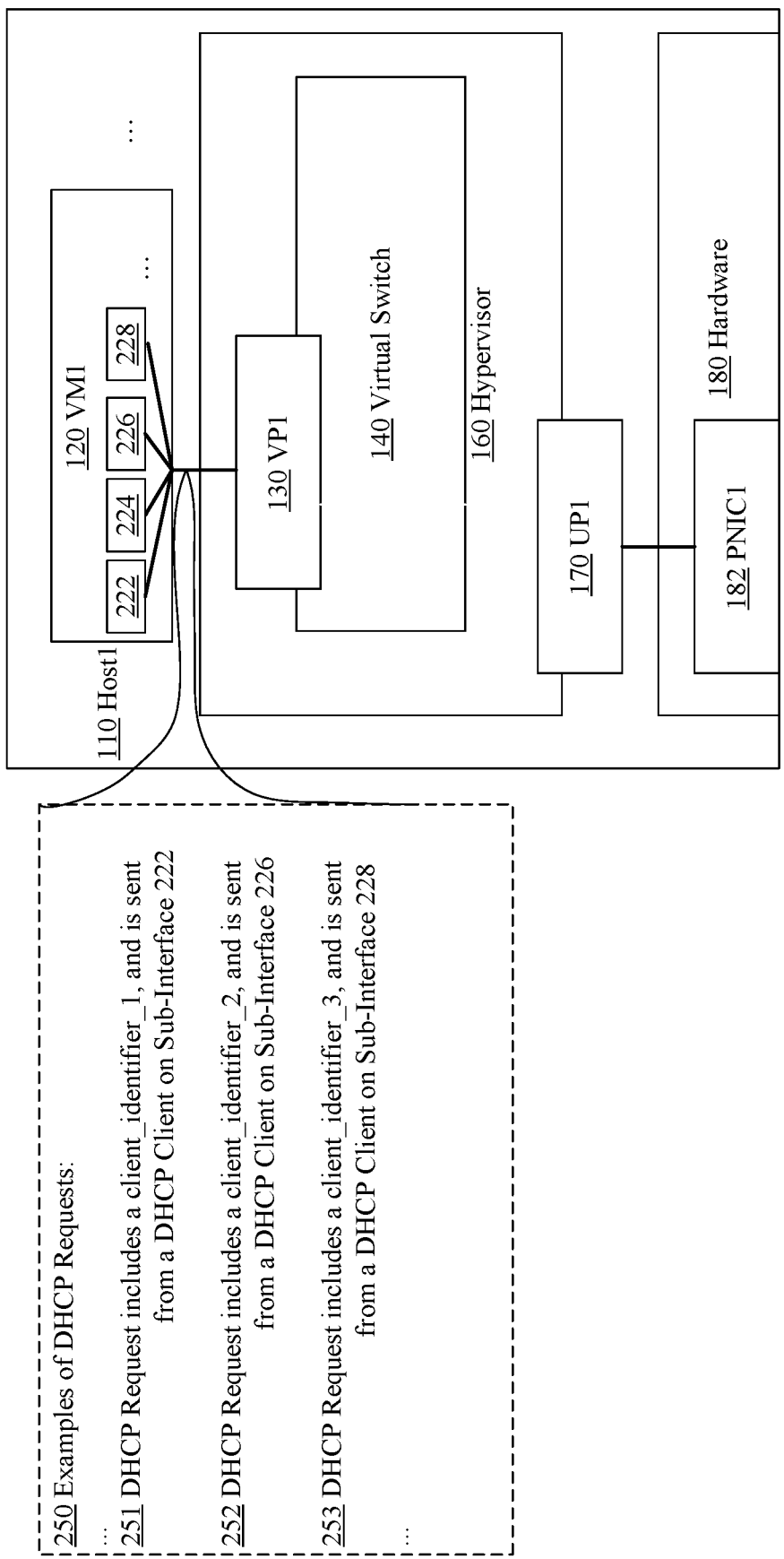
FIG. 2 is a block diagram depicting example DHCP requests received from an example virtual machine.

FIG. 2 is a block diagram depicting example DHCP requests received from an example virtual machine. Elements such as host 110, VM1 120, VP1 130, virtual switch 140, hypervisor 160, UP1 170, PNIC 182, and hardware 180 are described in detail in FIG. 1.

The depicted examples 250 of DHCP requests include DHCP requests 251, 252, and 253. DHCP request 251 includes a client identifier 1, and is sent from a DHCP client on a sub-interface 222. DHCP request 252, includes a client identifier 2, and is sent from a DHCP client on a sub-interface 226. DHCP request 253 includes a client identifier 3, and is sent from a DHCP client on a sub-interface 228. The depicted examples are not to be viewed as limiting in any way.

Upon receiving any of DHCP requests 251, 252, and/or 253, hypervisor 160 may determine whether the received request is legitimate, or might have been sent by a rogue DHCP client. The determination may be performed by executing one or more processes described in FIG. 3A-3B, 4A-4B, and/or 5A-5B.

Example Approach for a Soft Count Restriction

Figure 3B:
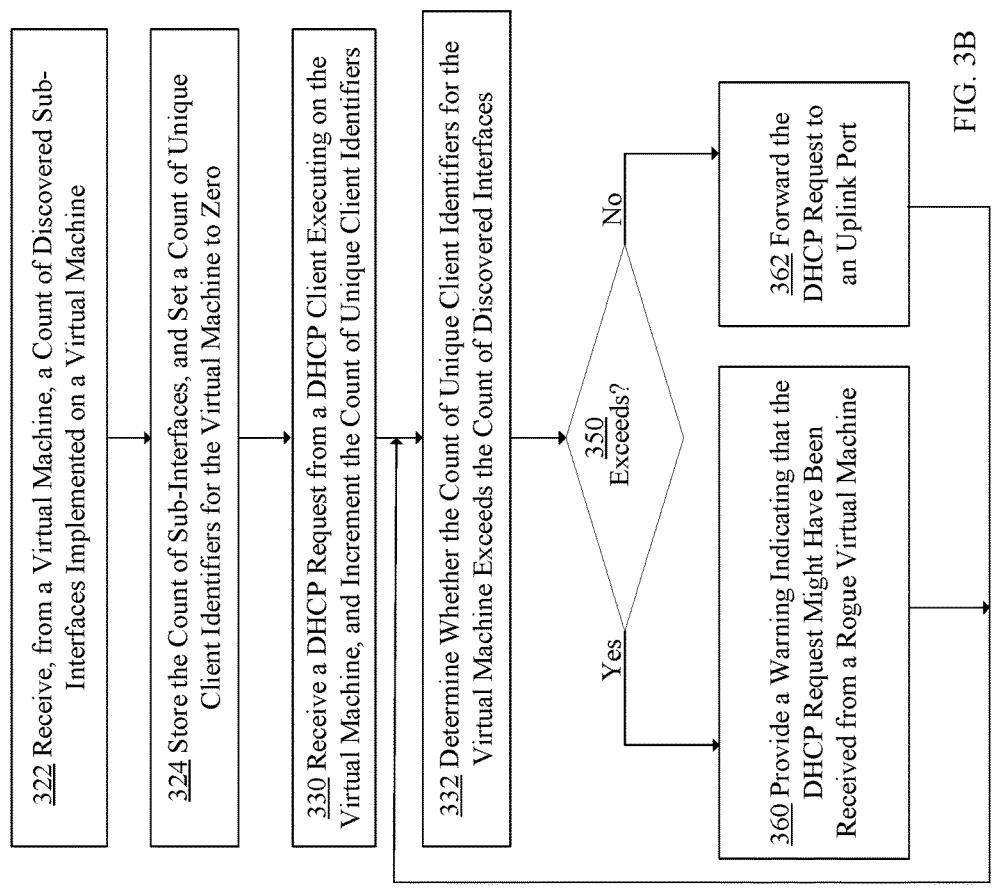
FIG. 3B depicts an example flow chart for securing a DHCP server from unauthorized client attacks using a soft count restriction on client identifiers.
Figure 3A:
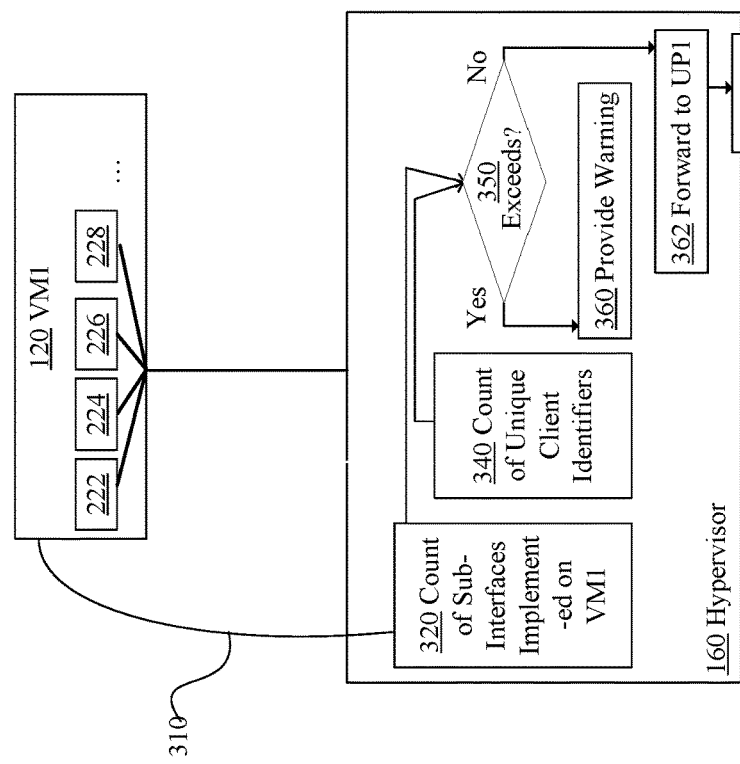
FIG. 3A depicts an example approach for securing a DHCP server from unauthorized client attacks using a soft count restriction on client identifiers.

FIG. 3A depicts an example approach for securing a DHCP server from unauthorized client attacks using a soft count restriction on client identifiers. In an embodiment, prior to receiving DHCP requests, a hypervisor receives (an element 310), from VM1 120, a count of sub-interfaces that are implemented on VM1 120. The hypervisor stores the received count as a count 320 of sub-interfaces implemented on VM1 120. Furthermore, the hypervisor sets a count 340 of unique identifiers for VM1 120 to zero.

As the hypervisor receives DHCP requests from DHCP clients (via sub-interfaces 222, 224, 226, 228) executing on VM1 120, the hypervisor parses the received DHCP requests. For example, upon receiving a DHCP request, the hypervisor parses the DHCP request to identify a client identifier in the DHCP request, and increments the count 340 of the unique client identifiers for VM1 120. The hypervisor compares the count 340 of the identified unique client identifiers with the count 320 of sub-interfaces implemented on VM1 120.

If it is determined, in a decision block 350, that count 340 exceeds count 320, then in step 360, a warning is provided/displayed/communicated, and the request is most likely blocked from being transmitted to the UP1 170. However, if count 340 does not exceed count 320, then, in step 362, the DHCP request is provided to UP1 170.

The hypervisor may maintain the corresponding counters for all VMs that are served by the hypervisor, and perform the count restriction for each VM separately.

In this approach, the count of sub-interfaces is provided by the virtual machine itself. Thus, the count may be potentially forged by the clients of the virtual machine itself.

Thus, the test is relatively weak, and the approach described in FIG. 3B is referred to as the soft count restriction approach.

Example Flow Chart for a Soft Count Restriction

FIG. 3B depicts an example flow chart for securing a DHCP server from unauthorized client attacks using a soft count restriction on client identifiers. The steps 322-362 are performed by a hypervisor for each virtual machine that is served by the hypervisor.

A hypervisor performs steps 322-324 before the hypervisor is ready to receive DHCP requests from a virtual machine. Specifically, in step 322, the hypervisor receives, from the virtual machine, a count of discovered sub-interfaces implemented on the virtual machine.

In step 324, the hypervisor stores the count of sub-interfaces. For example, the hypervisor may store it as count 320, depicted in FIG. 3A. The count is used by the hypervisor to restrict the count of different identifiers that may be used in DHCP requests received from the virtual machine.

Also in this step, the hypervisor sets a count of unique client identifiers for the virtual machine to zero. For example, the hypervisor may reset count 340, depicted in FIG. 3A. Once this step is completed, the hypervisor is ready to receive DHCP requests from the virtual machine.

In step 330, the hypervisor receives a DHCP request from a DHCP client that is executing on the virtual machine. For example, a filter component within a virtual switch may identify the packet as a DHCP request and pass the packet information to a DHCP request processor subcomponent of the virtual switch. Upon receiving the DHCP request, the hypervisor increments the count of unique client identifiers, such as count 340 depicted in FIG. 3A.

In step 332, the hypervisor determines whether the count of unique client identifiers for the virtual machine exceeds the count of discovered sub-interfaces. For example, the hypervisor may compare count 340 with count 320, depicted in FIG. 3A.

In step 350, the hypervisor determines the result of the comparison. If the count of unique client identifiers for the virtual machine exceeds the count of discovered sub-interfaces, then step 360 is performed. Otherwise, step 362 is performed.

If the hypervisor determined that the count of unique client identifiers for the virtual machine exceeds the count of discovered sub-interfaces, then, in step 360, the hypervisor may generate and display a warning that indicates that the DHCP request might have been received from a rogue DHCP client or a rogue virtual machine, and might be part of a malicious attack launched by the rogue. For example, hypervisor 160 may send a message to a control and/or management plane containing a potential DoS attack alert. If the central control plane receives the message, it can send it on to the management plane, which can alert an administrator/user or a separate monitoring entity. Furthermore, the hypervisor may block forwarding the DHCP request to a DHCP server.

However, if the hypervisor determines that the count of unique client identifiers for the virtual machine does not exceed the count of discovered sub-interfaces, then, in step 362, the hypervisor, such as the virtual switch component of the hypervisor, forwards the DHCP request to an uplink port implemented in the hypervisor for transmission to a DHCP server. The hypervisor presumes here that the DHCP request is most likely legitimate.

Example Approach for a Hard Count Restriction

FIG. 4A depicts an example approach for securing a DHCP server from unauthorized client attacks using a hard count restriction on client identifiers. In an embodiment, prior to receiving DHCP request from a virtual machine, a hypervisor receives (an element 410), from an MP/CCP 405, a count of sub-interfaces that are implemented on VM1 120. The hypervisor stores the received count as a count 420 of sub-interfaces implemented on VM1 120. Furthermore, the hypervisor sets a count 340 of unique identifiers for VM1 120 to zero.

As the hypervisor receives DHCP requests from DHCP clients (via sub-interfaces 222, 224, 226, 228) executing on VM1 120, the hypervisor parses the received DHCP requests. Specifically, upon receiving a DHCP request, the hypervisor parses the DHCP request to identify a client identifier included in the DHCP request, and increments the count 440 of the unique client identifiers for VM1 120. The hypervisor compares, in step 450, the count 440 of the identified unique client identifiers with the count 420 of sub-interfaces implemented on the VM1 120.

If count 440 exceeds count 420, then, in step 460, a warning is provided, and the DHCP request is blocked from being transmitted to a DHCP server. However, if count 440 does not exceed count 420, then the DHCP request is provided to UP1 170, and then transmitted to the DHCP server.

The hypervisor may maintain the corresponding counters for all VMs that the hypervisor serves, and perform the above process for each VM separately.

In this approach, the count of sub-interfaces is provided by an MP/CCP, not by the virtual machine. Therefore, the count can unlikely be forged by the virtual machine. Thus, the test is stronger than a soft restriction, and therefore it is referred to as the hard count restriction.

Example Flow Chart for a Hard Count Restriction

FIG. 4B depicts an example flow chart for securing a DHCP server from unauthorized client attacks using a hard count restriction on client identifiers. The steps 422-462 are performed by a hypervisor for each virtual machine that is served by the hypervisor.

A hypervisor performs steps 422-424 before the hypervisor is ready to receive DHCP requests from a virtual machine. Specifically, in step 422, the hypervisor receives, from either an MP or a CCP, a count of discovered sub-interfaces implemented on the virtual machine. the count of discovered sub-interfaces may be provided by either the MP or the CCP as each of them may discover that count independently from each other or in collaboration with each other.

In step 424, the hypervisor stores the count of sub-interfaces. For example, the hypervisor may store that count as count 420, depicted in FIG. 4A. This count is used by the hypervisor to restrict the count of different identifiers that may be included in DHCP requests received from the virtual machine.

Also in this step, the hypervisor sets a count of unique client identifiers for the virtual machine to zero. The hypervisor may store that count as count 440, depicted in FIG. 4A. Once this step is completed, the hypervisor is ready to receive DHCP requests from the virtual machine.

In step 430, the hypervisor receives a DHCP request from a DHCP client that is executing on the virtual machine.

Upon receiving the DHCP request, the hypervisor increments the count of unique client identifiers, such as count 440 depicted in FIG. 4A.

In step 432, the hypervisor determines whether the count of unique client identifiers for the virtual machine exceeds the count of discovered sub-interfaces. For example, the hypervisor may compare count 440 with count 420, depicted in FIG. 4A.

In step 450, the hypervisor determines the results of the comparison. If the count of unique client identifiers for the virtual machine exceeds the count of discovered sub-interfaces, then step 460 is performed. Otherwise, step 462 is performed.

If the hypervisor determined that the count of unique client identifiers for the virtual machine exceeds the count of discovered sub-interfaces, then, in step 460, the hypervisor may generate and display a warning that indicates that the DHCP request might have been received from a rogue DHCP client, and that the DHCP request might be part of a malicious attack. Furthermore, the hypervisor may block forwarding the DHCP request to a DHCP server.

However, if the hypervisor determines that the count of unique client identifiers for the virtual machine does not exceed the count of discovered interfaces, then in step 462, the hypervisor forwards the DHCP request to an uplink port implemented in the hypervisor. The hypervisor assumes that the DHCP request is most likely legitimate.

In this approach, the count of sub-interfaces that are implemented on the virtual machine is provided by an MP/CCP, but not by the virtual machine itself. Therefore, regardless of the count that the virtual machine may provide to the hypervisor, the hypervisor relies on the count of sub-interfaces provided by the MP/CCP. Therefore, the test is considered to be strong, and the approach described in FIG. 4B is referred to the hard count restriction approach.

Example Approach for a Value Restriction

Figure 5B:
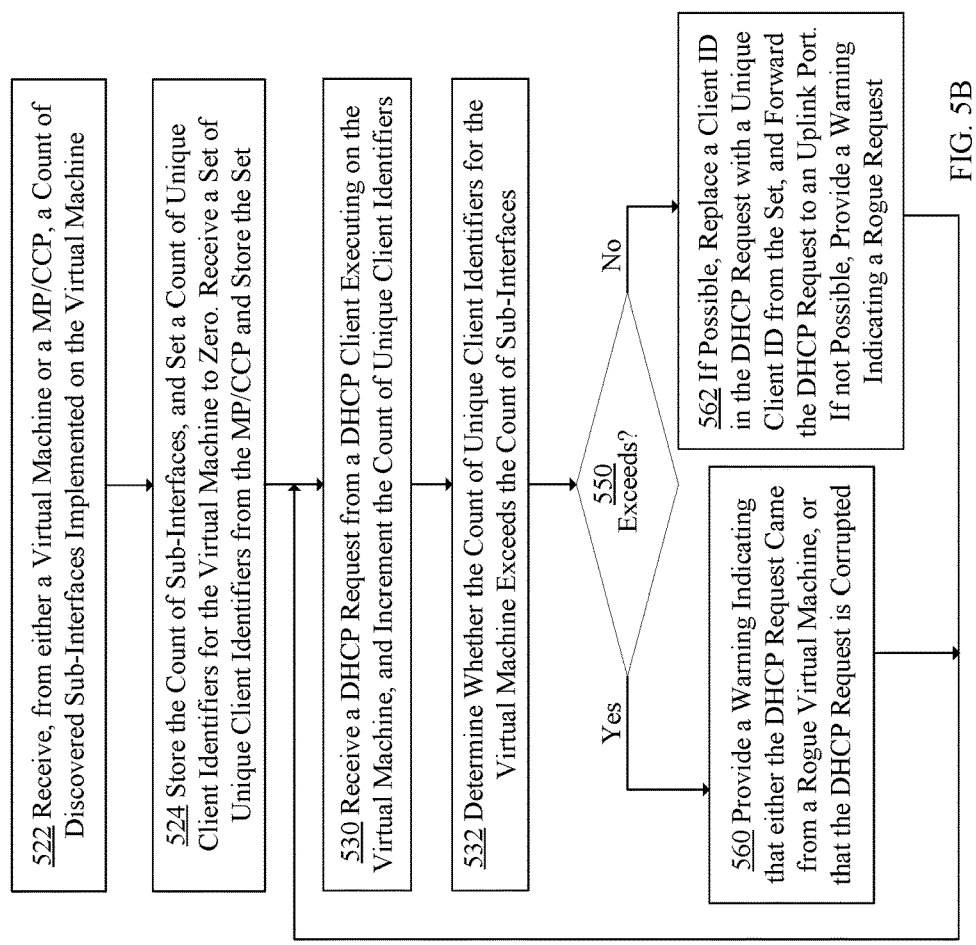
FIG. 5B depicts an example flow chart for securing a DHCP server from unauthorized client attacks using a value restriction on client identifiers.
Figure 5A:
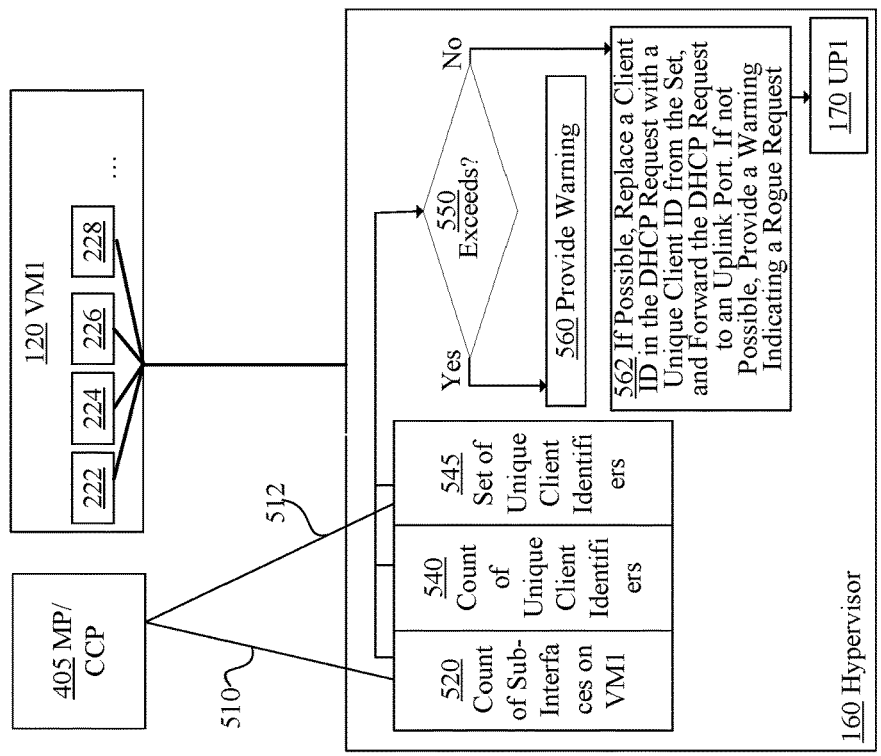
FIG. 5A depicts an example approach for securing a DHCP server from unauthorized client attacks using a value restriction on client identifiers.

FIG. 5A depicts an example approach for securing a DHCP server from unauthorized client attacks using a value restriction on client identifiers. In an embodiment, prior to receiving DHCP requests from a VM, a hypervisor receives (via a link 510 from an MP/CCP, or via a link 530 from VM1 120), a count of sub-interfaces implemented on the VM. The hypervisor stores the received count as a count 520. If the count was received from VM1 120, then the hypervisor sends the count 520 to the MP/CCP.

Furthermore, the hypervisor receives, via a link 512, a set of unique client identifiers, and stores the set as a set 545. Also in this step, the hypervisor sets a count of unique client identifiers for the virtual machine to zero. For example, the hypervisor may set count 540, depicted in FIG. 5A, to zero. Once this step is completed, the hypervisor is ready to receive DHCP requests from the virtual machine.

Once the hypervisor receives a DHCP request from a DHCP client that is executing on VM1 120, the hypervisor increments the count of unique client identifiers, such as count 540 depicted in FIG. 5A.

If the count of unique client identifiers exceeds the count of sub-interfaces implemented on VM1 120, then a warning is provided, and the DHCP request is not forwarded to a DHCP server.

However, if the count of unique client identifiers does not exceed the count of sub-interfaces, then the hypervisor parses the received DHCP request, and identifies a particular client identifier in the DHCP request. Furthermore, the hypervisor checks if the particular client identifier has been already mapped on any of the set of unique client identifiers, such as set 540.

If it has, then the hypervisor retrieves, from set 545, a particular unique client identifier onto which the particular client identifier has been mapped, and replaces, in the DHCP request, the particular client identifier with the particular unique client identifier. Then, in step 562, the hypervisor transmits the modified DHCP request to the uplink UP1, and the modified DHCP request is transmitted to a DHCP server.

However, if the hypervisor determines that the particular client identifier has not been mapped on any of the unique client identifiers in set 545, then the hypervisor checks if there is any unmapped unique client identifier in set 545. If a certain, unmapped, unique client identifier is presented in set 545, then, in step 562, the hypervisor replaces the particular client identifier in the DHCP request with the certain unique client identifier, updates the mappings maintained for set 545, and forwards the DHCP request to UP1 170.

But, if there is no unmapped unique client identifier in set 545 left, then the hypervisor provides a warning that indicates that the DHCP request might have been provided by a rogue DHCP client, and thus the hypervisor will unlikely transmit the DHCP request to a DHCP server.

A value restriction approach, described herein, provides a mechanism that is stronger than a soft count restriction, or even a hard count restriction. To determine whether a received DHCP request is legitimate, the value restriction approach uses not only a count of sub-interfaces, but also unique client identifiers provided by an MP/CCP. In this approach, legitimacy of the DHCP request is determined when a hypervisor is able to replace a particular client identifier included in the DHCP request with a particular unique client identifier that was provided by the MP/CCP. Since the unique client identifiers are not provided to a DHCP client, and DHCP client is unaware of the unique client identifiers or the replacements, the DHCP client cannot use the unique client identifiers for malicious purposes.

Example Flow Chart for a Value Restriction

FIG. 5B depicts an example flow chart for securing a DHCP server from unauthorized client attacks using a value restriction on client identifiers. Steps 522-562 are performed by a hypervisor for each virtual machine that is served by the hypervisor. Steps 522-524 are performed before the hypervisor is ready to receive DHCP requests from the virtual machines, while steps 530-562 are performed in response to receiving DHCP requests from the virtual machines.

In step 522, the hypervisor receives, from either an MP or a CCP or both, a count of discovered sub-interfaces implemented on a virtual machine. The count of sub-interfaces may be discovered by the MP and the CCP independently from each other, or may be discovered by the MP and the CCP as they collaborate with each other.

In step 524, the hypervisor stores the count of sub-interfaces. The hypervisor may store the count as for example, a count 520, which is depicted in FIG. 5A. The count is used by the hypervisor to restrict the count of unique client identifiers that the virtual machine may use in its DHCP requests.

Also in this step, the hypervisor sets a count of unique client identifiers for the virtual machine to zero. The count of unique client identifiers for the virtual machine may be stored as for example, a count 540, depicted in FIG. 5A.

Furthermore, in this step, the hypervisor receives a set of unique client identifiers from the MP/CCP, and stores the set as a set 545. The set of unique client identifiers includes the unique client identifiers that the MP/CCP generated for the virtual machine. The hypervisor will use the unique client identifiers that are included in the set to process the DHCP requests received from the virtual machine. The set includes as many client identifiers as indicated by the count of sub-interfaces 520. For example, if count 520 is "100," then the set of unique client identifiers received from the MP/CCP includes 100 unique client identifiers.

The hypervisor will use the unique identifiers in the set of unique client identifiers to generate an identifier mapping that will map the client identifiers received in the DHCP requests from the virtual machine onto the unique client identifiers included in the set of unique client identifiers received from the MP/CCP. The identifier mapping is further described in step 560.

Once step 524 is completed, the hypervisor is ready to receive DHCP requests from the virtual machine.

In step 530, the hypervisor receives a DHCP request from a DHCP client that is executing on the virtual machine. Upon receiving the DHCP request, the hypervisor increments the count of unique client identifiers, such as count 540 that is depicted in FIG. 5A.

In step 532, the hypervisor determines whether the count of unique client identifiers for the virtual machine exceeds the count of sub-interfaces. For example, the hypervisor may compare count 540 with count 520, depicted in FIG. 5A.

In step 550, the hypervisor determines the results of the comparison. If the count of unique client identifiers for the virtual machine exceeds the count of sub-interfaces, then step 560 is performed. Otherwise, step 562 is performed.

In step 560, the hypervisor has determined that the count of unique client identifiers for the virtual machine exceeds the count of sub-interfaces, and therefore, the hypervisor determines that the DHCP request might have been received from a rogue virtual machine. Therefore, the hypervisor may generate and display a warning that indicates that the DHCP request might have been received from the rogue virtual machine, and thus the DHCP request might be part of a malicious attack launched by an illegitimate virtual machine. Furthermore, the hypervisor may block forwarding the DHCP request to a DHCP server.

However, if the hypervisor determines that the count of unique client identifiers for the virtual machine does not exceed the count of discovered interfaces, then in step 562, it is assumed that the virtual machine that sent the DHCP request might be legitimate. But, the hypervisor applies the value restriction on the client identifier included in the received DHCP request.

Applying the value restriction on the client identifier included in the received DHCP request involves extracting a particular client identifier from the received DHCP request, and using the particular client identifier as a key to query the identifier mapping described in step 524.

Querying of the identifier mapping may include determining whether the particular client identifier has been already mapped onto a particular unique client identifier in the set of unique client identifiers received from the MP/CCP. If the particular client identifier has been already mapped on the particular unique client identifier from the set, then the identifier mapping includes a particular mapping entry that maps the particular client identifier onto the particular unique identifier. Therefore, the hypervisor may retrieve the particular mapping entry from the identifier mapping, extract the particular unique client identifier from the identifier mapping, and replace the particular client identifier in the DHCP request with the particular unique client identifier. Then, the hypervisor may forward the modified the DHCP request to an uplink port.

However, if the particular client identifier, extracted from the DHCP request, has not been mapped onto any unique client identifier in the set of unique client identifiers received from the MP/CCP, then a conclusion may be drawn that the particular client identifier is being used for the first time by the virtual machine in the DHCP request. Therefore, the hypervisor may determine whether the set of unique client identifiers received from the MP/CCP includes a certain unique client identifier that has not yet been mapped on any of the client identifiers included in the DHCP requests received from the virtual machine. If such a certain unique client identifier is available in the set, then the hypervisor maps the particular client identifier received from the virtual machine onto the certain unique client identifier from the set, and generates a particular mapping entry that includes the particular client identifier mapped onto the certain unique client identifier. Then, the hypervisor may add the particular mapping entry to the identifier mapping. Furthermore, the hypervisor may replace, in the DHCP request, the particular client identifier with the certain unique client identifier from the particular mapping entry, and transmit the modified DHCP request to the uplink port.

In this approach, the count of sub-interfaces that are implemented on the virtual machine is provided by the MP/CCP, but not by the virtual machine itself. Therefore, regardless of the count that the virtual machine may provide to the hypervisor, the hypervisor relies on the count of the sub-interfaces provided by the MP/CCP. Therefore, the hypervisor relies on the count of sub-interfaces provided by the MP/CCP, and ignores the count that may be provided by the virtual machine.

Using the value restriction approach, the hypervisor not only tests whether the count of unique client identifiers for the virtual machine exceeds the count of sub-interfaces, but also tests whether the client identifiers used by the virtual machine can be mapped onto the set of unique client identifiers received from the MP/CCP. For example, if a particular client identifier, included in a particular DHCP request, has been mapped by the hypervisor onto a particular unique client identifier from the set of unique client identifier received from the MP/CCP, then the hypervisor will keep replacing the particular client identifier in the DHCP requests with the particular unique client identifier until the time-to-live of the particular unique client identifier expires. Upon the expiration of the time-to-live of the particular unique client identifier, the hypervisor may remove the particular mapping entry from the identifier mapping, and return the particular unique client identifier to a pool of unique client identifiers available for new mappings. However, if a rogue DHCP client continues sending DHCP requests with the particular client identifier, the hypervisor may filter out such DHCP requests because the hypervisor is aware of the fact that the time-to-live for the corresponding unique client identifier has expired.

If a particular client identifier, included in a particular DHCP request, has not been mapped by the hypervisor onto a particular unique client identifier from the set of unique client identifier received from the MP/CCP, and a pool of identifiers available for mapping contains no unique client identifiers available for mapping and assigning, then the hypervisor may deduce that the received DHCP request might have been sent from an illegitimate virtual machine, and/or that the received DHCP request may be part of a malicious attack on a DHCP server.

A value restriction approach provides a mechanism that is stronger than a soft count restriction and a hard count restriction. The value restriction approach not only uses a count of sub-interfaces to determine whether a received DHCP request is legitimate, but also names of the identifiers included in the DHCP requests and unique identifiers provided by the MP/CCP to determine whether the received DHCP request was sent by a legitimate DHCP client.

Implementation Mechanisms

The present approach may be implemented using a computing system comprising one or more processors and memory. The one or more processors and memory may be provided by one or more hardware machines. A hardware machine includes a communications bus or other communication mechanisms for addressing main memory and for transferring data between and among the various components of hardware machine. The hardware machine also includes one or more processors coupled with the bus for processing information. The processor may be a microprocessor, a system on a chip (SoC), or other type of hardware processor.

Main memory may be a random-access memory (RAM) or other dynamic storage device. It may be coupled to a communications bus, and used for storing information and software instructions to be executed by a processor. Main memory may also be used for storing temporary variables or other intermediate information during execution of software instructions to be executed by one or more processors.

General Considerations

Although some of various drawings may illustrate a number of logical stages in a particular order, stages that are not order dependent may be reordered and other stages may be combined or broken out. While some reordering or other groupings may be specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described regarding specific embodiments. However, the illustrative embodiments above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the uses contemplated.

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used herein the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to affect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

What is claimed is:

1. A method for a hypervisor to secure a dynamic host configuration protocol (DHCP) server against unauthorized client attacks in a software defined networking environment, the method comprising:
   determining a count of sub-interfaces implemented on an interface card of a virtual machine;
   setting a count of unique client identifiers for the virtual machine to zero;
   determining whether a dynamic host configuration protocol (DHCP) request has been received from the virtual machine;
   in response to determining that a DHCP request has been received from the virtual machine:
      determining a current count of the unique client identifiers by incrementing the count of the unique client identifiers based on a number of client identifiers included in the DHCP request;
      determining whether the current count of the unique client identifiers exceeds the count of the sub-interfaces implemented on the interface card of the virtual machine; and
      in response to determining that the current count of the unique client identifiers does not exceed the count of the sub-interfaces implemented on the interface card of the virtual machine, forwarding the DHCP request to an uplink port.

2. The method of claim 1, further comprising:
in response to determining that the current count of unique client identifiers does not exceed the current count of sub-interfaces implemented on the interface card of the virtual machine:
parsing the DHCP request to identify a particular client identifier included in the DHCP request;
determining whether the particular client identifier is mapped on a particular unique client identifier from a set of unique client identifiers received from a management plane or a control plane;
in response to determining that the particular client identifier is mapped on the particular unique client identifier from the set of unique client identifiers:
retrieving the particular unique client identifier from the set of unique client identifiers;
replacing the particular client identifier in the DHCP request with the particular unique client identifier; and
forwarding the DHCP request to an uplink port.

3. The method of claim 2, further comprising:
transmitting, to the management plane, the count of sub-interfaces implemented on the interface card of the virtual machine;
in response to transmitting the count of sub-interfaces to the management plane, receiving, from the management plane, the set of unique client identifiers that includes a particular count of unique client identifiers; and
wherein the particular count of unique client identifiers corresponds to the count of sub-interfaces implemented on the interface card of the virtual machine.

4. The method of claim 1, further comprising:
in response to determining that the current count of unique client identifiers does not exceed the count of sub-interfaces implemented on the interface card of the virtual machine, transmitting the DHCP request to a DHCP server.

5. The method of claim 1, further comprising:
in response to determining that the current count of unique client identifiers exceeds the count of sub-interfaces implemented on the interface card of the virtual machine, generating a warning indicating that the DHCP request might have been received from a rogue virtual machine.

6. The method of claim 1, further comprising:
determining whether a DHCP address release request has been received from the virtual machine; and
in response to determining that a DHCP address release request has been received from the virtual machine, decrementing the current count of unique client identifiers.

7. The method of claim 1, wherein the count of sub-interfaces implemented on the interface card of the virtual machine is provided by one or more of: a management plane, a control plane, or the virtual machine.

8. One or more non-transitory computer-readable storage media storing one or more computer instructions which, when executed by one or more processors, cause the one or more processors to perform:
determining a count of sub-interfaces implemented on an interface card of a virtual machine;
setting a count of unique client identifiers for the virtual machine to zero;
determining whether a dynamic host configuration protocol (DHCP) request has been received from the virtual machine;
in response to determining that a DHCP request has been received from the virtual machine:
determining a current count of the unique client identifiers by incrementing the count of the unique client identifiers based on a number of client identifiers included in the DHCP request;
determining whether the current count of the unique client identifiers exceeds the count of the sub-interfaces implemented on the interface card of the virtual machine; and
in response to determining that the current count of the unique client identifiers does not exceed the count of the sub-interfaces implemented on the interface card of the virtual machine, forwarding the DHCP request to an uplink port.

9. The one or more non-transitory computer-readable storage media of claim 8, storing additional instructions which, when executed by the one or more processors, cause the one or more processors to perform:
in response to determining that the current count of unique client identifiers does not exceed the count of sub-interfaces implemented on the interface card of the virtual machine:
parsing the DHCP request to identify a particular client identifier included in the DHCP request;
determining whether the particular client identifier is mapped on a particular unique client identifier from a set of unique client identifiers received from a management plane or a control plane;
in response to determining that the particular client identifier is mapped on the particular unique client identifier from the set of unique client identifiers:
retrieving the particular unique client identifier from the set of unique client identifiers;
replacing the particular client identifier in the DHCP request with the particular unique client identifier; and
forwarding the DHCP request to an uplink port.

10. The one or more non-transitory computer-readable storage media of claim 9, storing additional instructions which, when executed by the one or more processors, cause the one or more processors to perform:
transmitting, to the management plane, the count of sub-interfaces implemented on the interface card of the virtual machine;
in response to transmitting the count of sub-interfaces to the management plane, receiving, from the management plane, the set of unique client identifiers that includes a particular count of unique client identifiers; and
wherein the particular count of unique client identifiers corresponds to the count of sub-interfaces implemented on the interface card of the virtual machine.

11. The one or more non-transitory computer-readable storage media of claim 8, storing additional instructions which, when executed by the one or more processors, cause the one or more processors to perform:
in response to determining that the current count of unique client identifiers does not exceed the count of sub-interfaces implemented on the interface card of the virtual machine, transmitting the DHCP request to a DHCP server.

12. The one or more non-transitory computer-readable storage media of claim 8, further comprising:
in response to determining that the current count of unique client identifiers exceeds the count of sub-interfaces implemented on the interface card of the virtual machine, generating a warning indicating that the DHCP request might have been received from a rogue virtual machine.

13. The one or more non-transitory computer-readable storage media of claim 8, further comprising:
determining whether a DHCP address release request has been received from the virtual machine; and in response to determining that a DHCP address release request has been received from the virtual machine, decrementing the current count of unique client identifiers.

14. The one or more non-transitory computer-readable storage media of claim 8, wherein the count of sub-interfaces implemented on the interface card of the virtual machine is provided by one or more of: a management plane, a control plane, or the virtual machine.

15. A hypervisor implemented in a host computer and configured to secure a dynamic host configuration protocol (DHCP) server against unauthorized client attacks in a software defined networking environment, the hypervisor comprising:
one or more processors;
one or more memory units; and
one or more non-transitory computer-readable storage media storing one or more computer instructions which, when executed by the one or more processors, cause the one or more processors to perform:
determining a count of sub-interfaces implemented on an interface card of a virtual machine;
setting a count of unique client identifiers for the virtual machine to zero;
determining whether a dynamic host configuration protocol (DHCP) request has been received from the virtual machine;
in response to determining that a DHCP request has been received from the virtual machine:
determining a current count of the unique client identifiers by incrementing the count of the unique client identifiers based on a number of client identifiers included in the DHCP request
determining whether the current count of the unique client identifiers exceeds the count of the sub-interfaces implemented on the interface card of the virtual machine; and
in response to determining that the current count of the unique client identifiers does not exceed the count of the sub-interfaces implemented on the interface card of the virtual machine, forwarding the DHCP request to an uplink port.

16. The hypervisor of claim 15, wherein the one or more non-transitory computer-readable storage media store additional instructions which, when executed by the one or more processors, cause the one or more processors to perform:
in response to determining that the current count of unique client identifiers does not exceed the count of sub-interfaces implemented on the interface card of the virtual machine:
parsing the DHCP request to identify a particular client identifier included in the DHCP request;
determining whether the particular client identifier is mapped on a particular unique client identifier from a set of unique client identifiers received from a management plane or a control plane;
in response to determining that the particular client identifier is mapped on the particular unique client identifier from the set of unique client identifiers:
retrieving the particular unique client identifier from the set of unique client identifiers;
replacing the particular client identifier in the DHCP request with the particular unique client identifier; and
forwarding the DHCP request to an uplink port.

17. The hypervisor of claim 16, wherein the one or more non-transitory computer-readable storage media store additional instructions which, when executed by the one or more processors, cause the one or more processors to perform:
transmitting, to the management plane, the count of sub-interfaces implemented on the interface card of the virtual machine;
in response to transmitting the count of sub-interfaces to the management plane, receiving, from the management plane, the set of unique client identifiers that includes a particular count of unique client identifiers; and
wherein the particular count of unique client identifiers corresponds to the count of sub-interfaces implemented on the interface card of the virtual machine.

18. The hypervisor of claim 15, wherein the one or more non-transitory computer-readable storage media store additional instructions which, when executed by the one or more processors, cause the one or more processors to perform:
in response to determining that the current count of unique client identifiers does not exceed the count of sub-interfaces implemented on the interface card of the virtual machine, transmitting the DHCP request to a DHCP server.

19. The hypervisor of claim 15, wherein the one or more non-transitory computer-readable storage media store additional instructions which, when executed by the one or more processors, cause the one or more processors to perform:
determining whether a DHCP address release request has been received from the virtual machine; and
in response to determining that a DHCP address release request has been received from the virtual machine, decrementing the current count of unique client identifiers.

20. The hypervisor of claim 15, wherein the count of sub-interfaces implemented on the interface card of the virtual machine is provided by one or more of:
a management plane, a control plane, or the virtual machine.

* * * * *